Feb. 27, 1951 J. L. SCHOLL 2,543,471
MECHANICAL DEVICE FOR TEACHING HARMONICA PLAYING
Filed Dec. 27, 1946 2 Sheets-Sheet 1

Inventor
James L. Scholl
By McMorrow, Berman & Davidson
Attorneys

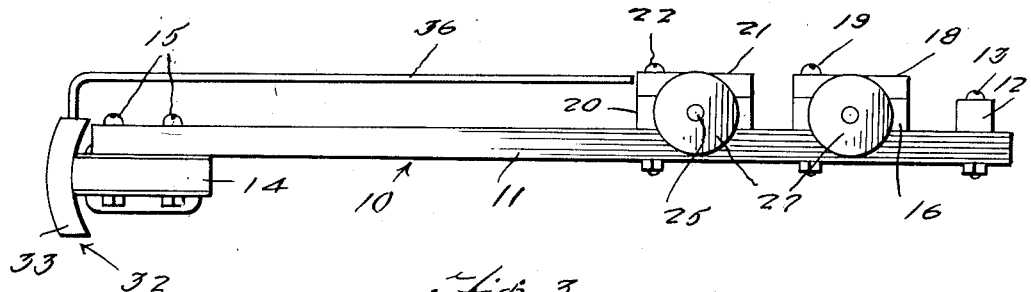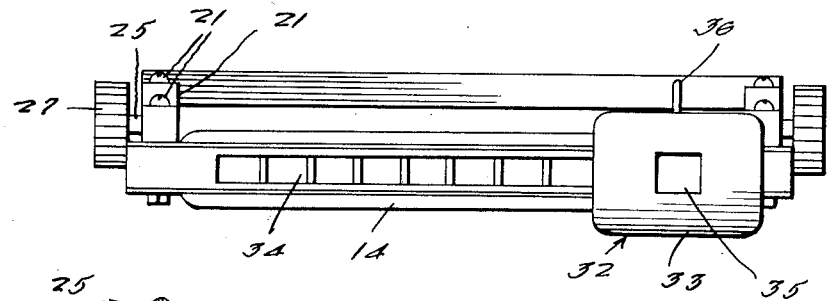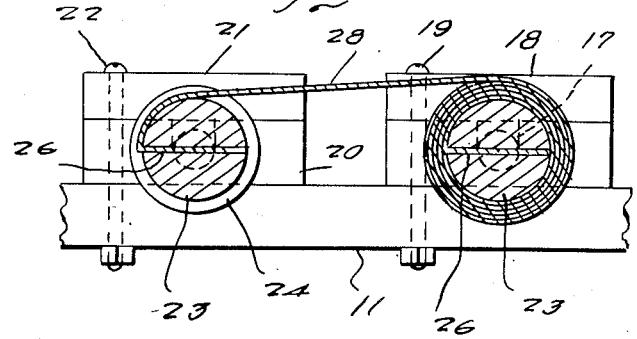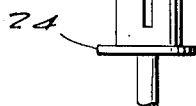

Patented Feb. 27, 1951

2,543,471

UNITED STATES PATENT OFFICE 2,543,471

MECHANICAL DEVICE FOR TEACHING HARMONICA PLAYING

James L. Scholl, Las Vegas, Nev.

Application December 27, 1946, Serial No. 718,775

1 Claim. (Cl. 84—477)

My invention relates to educational devices, and more particularly to a mechanical device for teaching harmonica playing.

The object of my invention is to provide a device adapted to support a harmonica and a printed roll indicating the notes to be played on said harmonica.

Another object of my invention is to provide a device of the character indicated above comprising a mouthpiece slidably attached to the harmonica and connected with an indicator adapted to be adjusted in accordance with the characters on the music roll by sliding the mouthpiece on the harmonica.

Other objects of my invention may appear in the following specification describing my invention, with reference to the accompanying drawings illustrating a preferred embodiment of my invention.

It is, however, to be understood that my invention is not to be limited or restricted to the exact construction and combination of parts described in the specification and shown in the drawings, but that such changes and modifications can be made which fall within the scope of the claim appended hereto.

In the drawings:

Figure 2 is a side view of Figure 1.

Figure 3 is a front view of Figure 1.

Figure 4 is a sectional view taken on line 4—4 of Figure 1.

Figure 5 is an elevational view of a roller adapted to support a music roll.

Figures 1, 6:
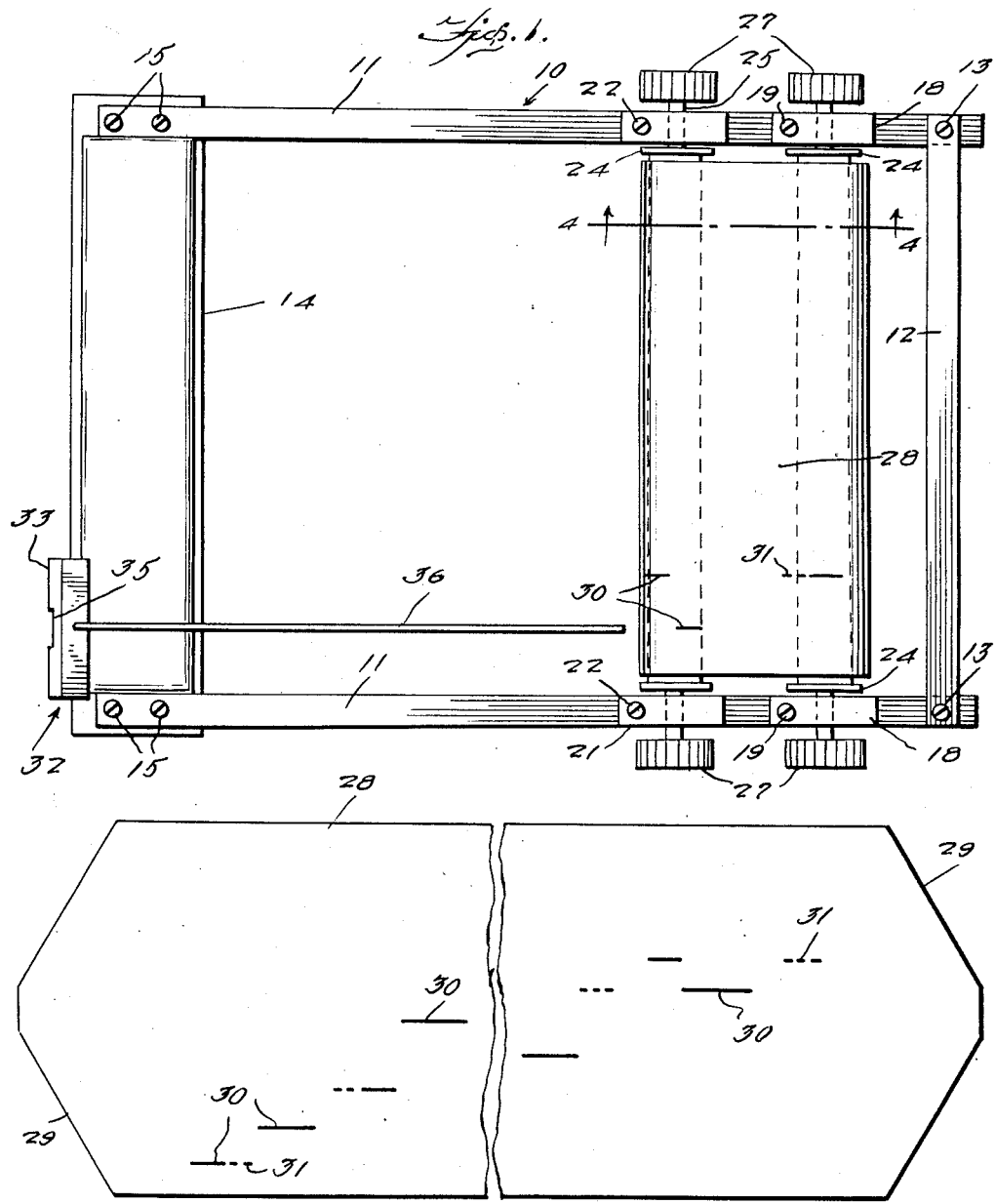
Figure 1 is a top plan view of the device according to my invention having a harmonica and a music roll attached thereto.
Figure 6 is a fragmentary plan view of a sheet of paper having characters printed thereon indicating the notes to be played and adapted to be rolled upon a roller shown in Figure 5.

Referring now in detail to the drawings, the device forming the subject matter of my invention comprises a frame 10 made from wood or any other suitable material. It consists of two lateral frame members 11 and a rear frame member 12. The two lateral frame members 11 extend approximately parallel to each other, and the ends of the rear frame member 12 are secured onto the lateral members adjacent their ends by means of screws 13, or in any other suitable manner.

To the front ends of the lateral frame members 11 a harmonica 14 is secured by means of screws 15, or in any other suitable manner.

A short distance in front of the rear frame member 12 a rear bearing block 16 is located on each of the lateral frame members 11 having an upwardly opening transverse groove 17 therein provided with an arcuate bottom. A cover block 18 fits on top of each bearing block 16 and a cover block 18 is secured to the corresponding lateral frame member 11 by a screw 19.

A distance in front of each set of bearing and cover blocks 16 and 18, respectively, a similar set consisting of a front bearing block 20 and a front cover block 21, is secured to each side frame member 11 by a screw 22.

A roller 23 is provided with an annular flange 24 adjacent each of its ends, and a stub shaft 25 is arranged on each end of said roller and extends coaxially and outwardly therefrom. A longitudinal slot 26 extends diametrically through the roller 23.

There are two of these rollers 23. One of them is rotatably mounted in the two front bearing blocks 20, and the other one is rotatably mounted in the rear bearing blocks 16, the stub shafts 25 being located in the respective grooves of these bearing blocks, and the corresponding cover blocks 21 and 18 preventing accidental removal of the rollers from said blocks.

On the outer end of each stub shaft 25 a knurled hand knob 27 is rigidly mounted.

A sheet of music is prepared in the following manner:

A long strip of paper 28 of such a width that it fits between the two flanges 24 on a roller has tapering ends 29 which are adapted to be inserted in the slot 26 in the roller 23.

The notes to be played on the harmonica are indicated by longitudinal lines printed on the paper sheet, so that they are located directly behind the hole in the harmonica 14 producing the desired note, when the sheet of music is arranged on the roller and the roller is positioned on the frame 10 in the rear bearing blocks 16. The front end of the sheet 28 is inserted in the slot 26 in the roller 23 located in the front bearing blocks 20, so that the music sheet can be rolled onto the front roller.

It is well known that different notes are produced by blowing into or sucking on a hole in the harmonica. To indicate if the player should blow or suck, two diffeernt kinds of lines are to be used as characters on the sheet of music. If the player should blow, a straight line 30 is shown, while a dotted line or broken line 31 is used to indicate that the player should suck.

A wooden mouthpiece 32, consisting of a small block 33 having a curved vertical cross-section, is adapted to be slidingly moved along the harmonica 14 in front of the playing holes 34 of said harmonica. The mouthpiece 32 has a centrally located square hole 35 therein of the same width as a playing hole 34, so that the mouthpiece 32 permits the use of only one playing hole 34 and covers the adjacent playing holes.

On the mouthpiece 32, a rearwardly extending pointer 36, made from stiff wire or any other suitable material, is fastened.

The music sheet is rolled up on the front roller 23 and the mouthpiece is moved along the harmonica to bring the pointer 36 in line with the characters on the music sheet. This brings the opening 35 in the mouthpieec in position to play the right note. The time value of each note is indicated by the proportional length of the lines 30 and 31 on the sheet of music.

It is easy to understand that the mouthpiece can be easily and readily moved into position to permit only the right note indicated on the sheet of music to be played.

In this manner, anybody can learn to play a harmonica without any knowledge of conventional musical characters.

Having described my invention, I claim as new and desire to secure by Letters Patent:

A mechanical device for teaching harmonica playing comprising a combination with a harmonica, of a frame including a pair of side frame members, means engaging one end of each of said members for securing the respective members to the opposite ends of the harmonica and extending from one side thereof, a pair of rollers rotatable between the other ends of said frame members, a mouthpiece slidable on the other end of the harmonica having an opening therein for registry with selected openings in the harmonica, an indicator fixed on said mouthpiece and extending in the direction of said rollers, an instruction sheet wound about said rollers for reeling from one to the other, and means engaging said rollers for rotating said rollers by a musician playing the harmonica.

JAMES L. SCHOLL.

REFERENCES CITED

The following references are of record in the file of this patent:

UNITED STATES PATENTS

| Number | Name | Date |
| --- | --- | --- |
| Re. 16,986 | Banks | June 5, 1928 |
| 176,124 | St. John | Apr. 11, 1876 |
| 375,531 | Chinnock et al. | Dec. 27, 1887 |
| 1,542,029 | Block | June 16, 1925 |
| 1,573,242 | Hand | Feb. 16, 1926 |
| 1,720,991 | Banks | July 16, 1929 |
| 1,722,852 | Miller | July 30, 1929 |

FOREIGN PATENTS

| Number | Country | Date |
| --- | --- | --- |
| 252,974 | Germany | Oct. 29, 1912 |
| 423,522 | Germany | Jan. 5, 1926 |